US010101093B2

(12) United States Patent
Pelissier

(10) Patent No.: US 10,101,093 B2
(45) Date of Patent: Oct. 16, 2018

(54) HEAT EXCHANGE DEVICE AND METHOD FOR MAKING SUCH A DEVICE

(71) Applicant: LIEBHERR-AEROSPACE TOULOUSE SAS, Toulouse (FR)

(72) Inventor: Bertrand Pelissier, Saint Alban (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 357 days.

(21) Appl. No.: 14/903,139

(22) PCT Filed: Jun. 20, 2014

(86) PCT No.: PCT/FR2014/051545
§ 371 (c)(1),
(2) Date: Feb. 23, 2016

(87) PCT Pub. No.: WO2015/004359
PCT Pub. Date: Jan. 15, 2015

(65) Prior Publication Data
US 2016/0216038 A1    Jul. 28, 2016

(30) Foreign Application Priority Data
Jul. 8, 2013  (FR) ..................................... 13 56697

(51) Int. Cl.
*F28F 3/12*    (2006.01)
*F28D 9/00*    (2006.01)
(Continued)

(52) U.S. Cl.
CPC ............ *F28D 9/0093* (2013.01); *B23P 15/26* (2013.01); *F28F 3/027* (2013.01); *F28F 3/12* (2013.01); *F28D 2001/0273* (2013.01)

(58) Field of Classification Search
CPC .... F28F 3/027; F28F 3/12; F28F 3/14; H05K 7/20254
(Continued)

(56) References Cited

U.S. PATENT DOCUMENTS 1,712,892 A    5/1929  Mantle
3,461,956 A *  8/1969  Otto ...................... F28D 9/0037
                                                      165/166
(Continued)

FOREIGN PATENT DOCUMENTS

DE    14 51 219 A1    4/1969
FR    1 189 606 A    10/1959
(Continued)

OTHER PUBLICATIONS

International Search Report, dated Oct. 6, 2014, from corresponding PCT application.

*Primary Examiner* — Allen Flanigan
(74) *Attorney, Agent, or Firm* — Young & Thompson

(57) ABSTRACT

A bent heat exchange device includes a heat-conducting outer plate, an inner plate, a partition separating an upstream area (23) and a downstream area (24), a fluid inlet, a fluid outlet, a flow guide (27) in the upstream area, a flow guide in the downstream area, the partition being mechanically secured to the inner plate and to the outer plate and including, between the upstream area (23) and the downstream area (24), a sealed partition (29) and a slatted partition (30) having openings for the flow of a heat transfer fluid.

16 Claims, 4 Drawing Sheets

Figure 4:
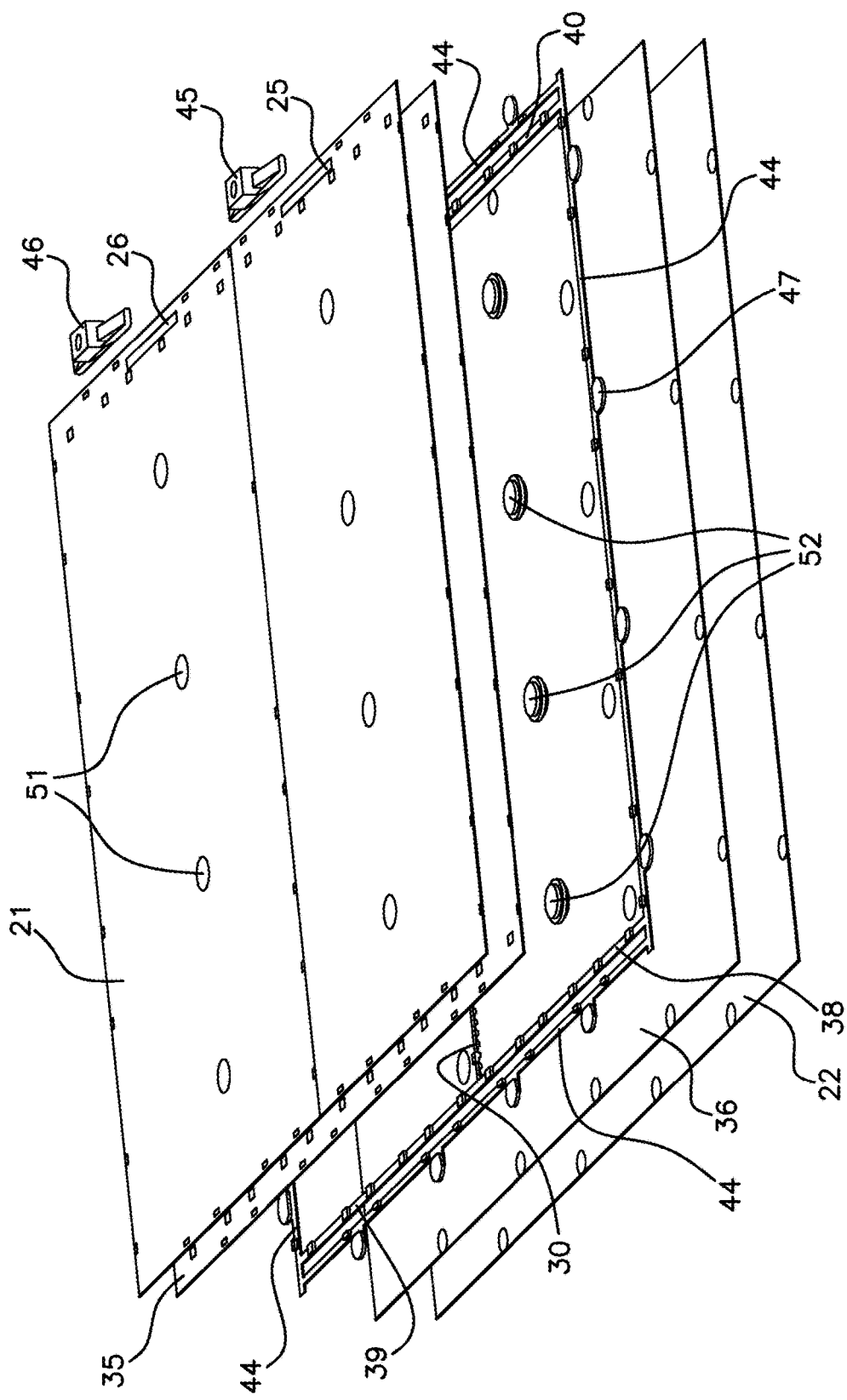

(51) Int. Cl.
  *F28F 3/02* (2006.01)
  *B23P 15/26* (2006.01)
  *F28D 1/02* (2006.01)
(58) Field of Classification Search
  USPC .................................................. 165/80.4, 170
  See application file for complete search history.

(56) References Cited

U.S. PATENT DOCUMENTS

| | | | | |
|---|---|---|---|---|
| 4,646,815 | A * | 3/1987 | Iwata | F28D 1/0308 165/170 |
| 5,906,236 | A * | 5/1999 | Adams | F28F 3/12 165/147 |
| 6,340,053 | B1 * | 1/2002 | Wu | F28D 9/0012 165/140 |
| 6,936,364 | B2 * | 8/2005 | Reinke | F28D 9/0068 422/198 |
| 7,213,638 | B2 * | 5/2007 | Seiler | F02M 31/20 165/148 |
| 2001/0045276 | A1 | 11/2001 | Ohashi | |
| 2003/0164233 | A1 * | 9/2003 | Wu | F28D 1/0308 165/166 |
| 2005/0115700 | A1 | 6/2005 | Martin et al. | |
| 2012/0222847 | A1 * | 9/2012 | Ford | F24J 2/045 165/170 |

FOREIGN PATENT DOCUMENTS

FR     2 778 973 A1   11/1999
GB        1109697 A    4/1968

\* cited by examiner

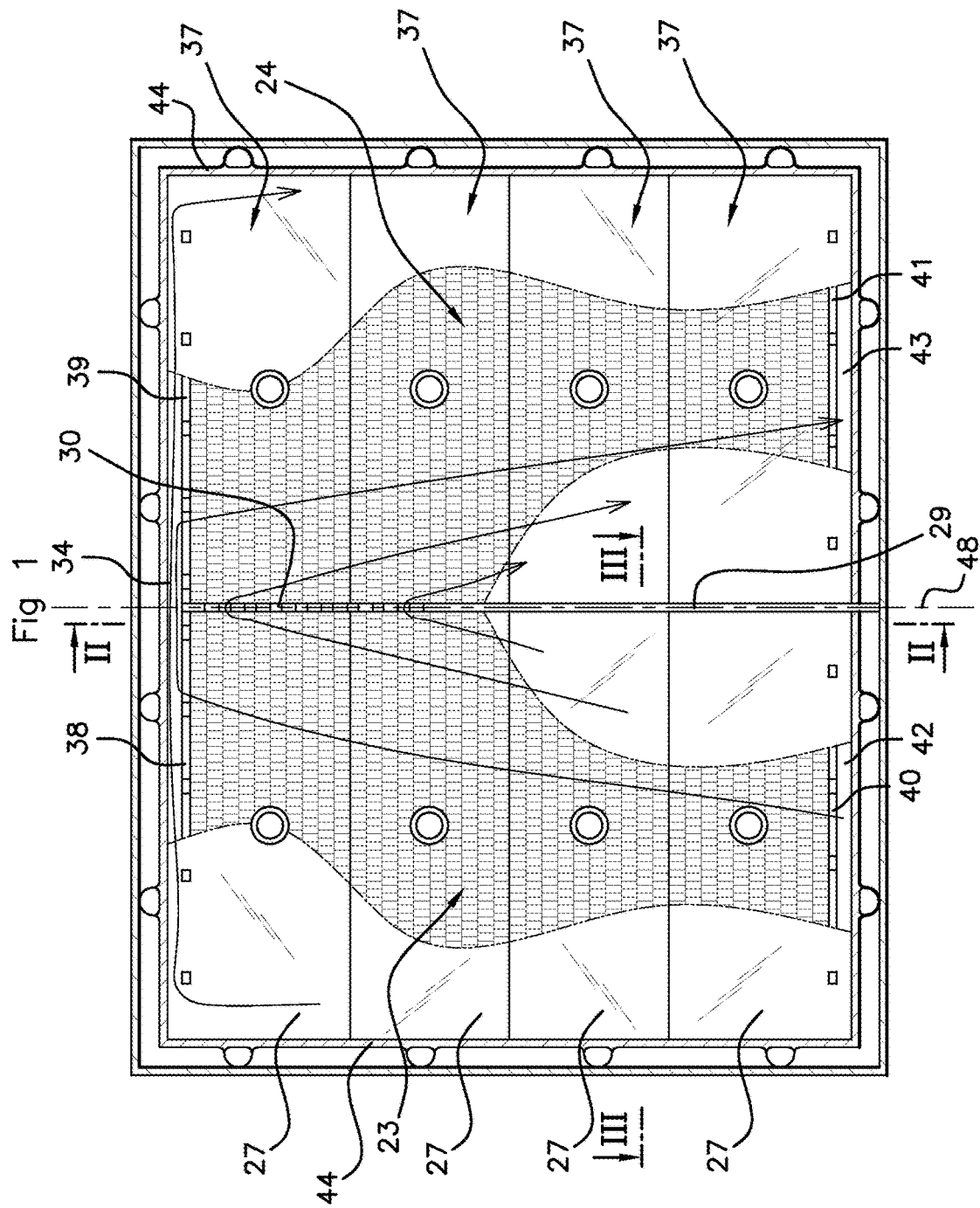

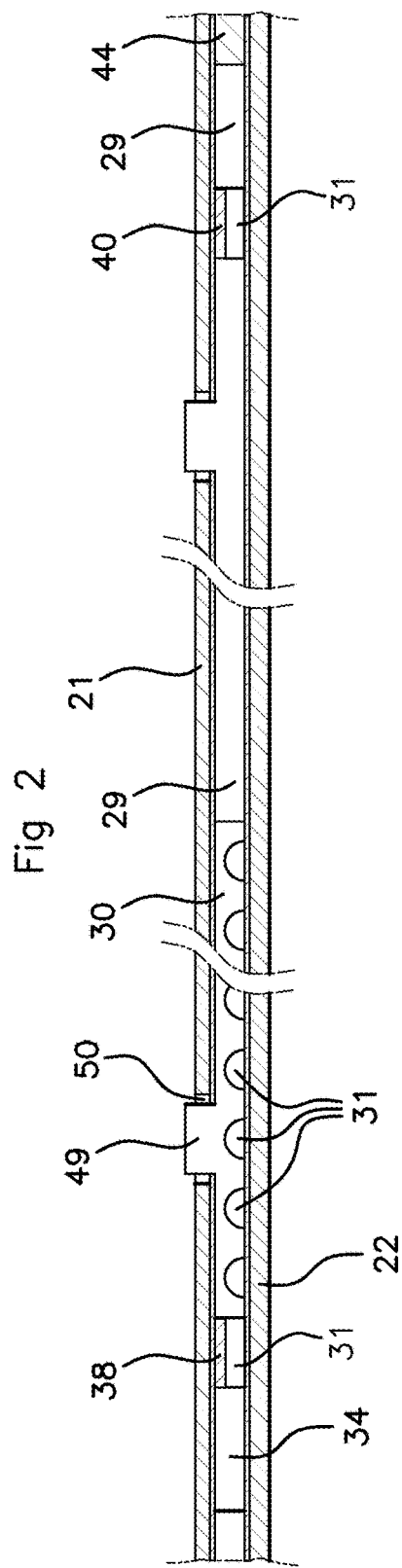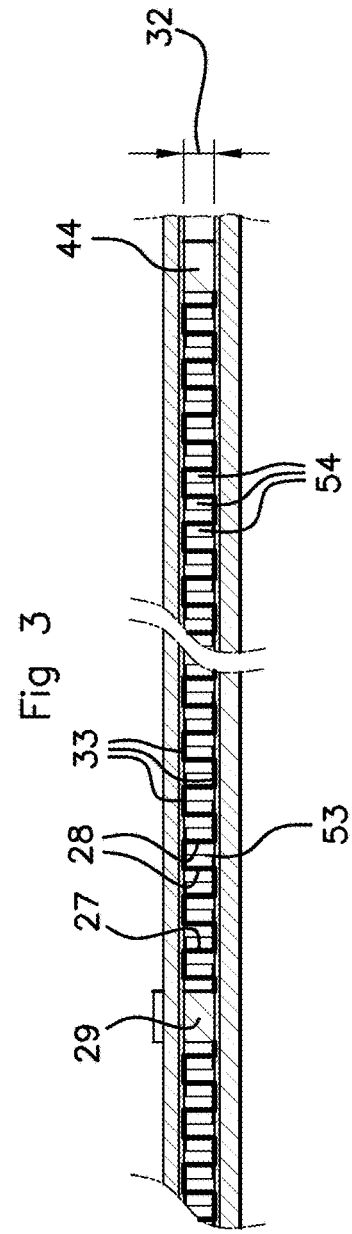

HEAT EXCHANGE DEVICE AND METHOD FOR MAKING SUCH A DEVICE

The invention relates to a heat exchange device, especially a heat exchanger for an atmospheric vehicle, and more particularly a heat exchanger capable of being integrated on the body of such a vehicle.

The invention relates in particular to a surface heat exchange device of small thickness, which can be bent and fixed to a fuselage panel of an aircraft.

Such a heat exchange device is used in the field of aircraft construction, where heat exchange solutions are sought which, more particularly, are effective and do not interfere with the aerodynamics of the aircraft, in particular of an aeroplane or helicopter. However, such a heat exchange device is also used in constructing and equipping other atmospheric vehicles, in particular vehicles for transport by rail, by road or by sea.

Many surface heat exchange devices for aircraft are known, but these devices are not adapted to be able to be in direct contact with the cold air outside the aircraft and therefore have a limited heat exchange efficiency. The heat exchangers of atmospheric vehicles are in fact rarely arranged in direct contact with the outside because of the difficulty of shaping them in an aerodynamic shape, especially in a bent shape.

They are rarely placed directly on the outside also because of their fragility. The pressure difference between the inside face of the exchanger, which is situated on the aircraft side, and the outside face is very considerable. The outside face especially experiences a considerable depression, which can lead to deformation of that face and therefore to a modified flow in the exchanger. Such deformation can therefore lead to considerable losses of efficiency of the exchanger.

In many exchangers, the fluid follows outward and return paths in order to optimise the heat exchange surface. However, the zones in which the fluid changes direction are particularly difficult to design in order to obtain devices which are both resistant to the pressure differences and can be bent to the aerodynamic shapes of a body.

Thus, JP H03025096 proposes a surface exchanger which is bent in a cylindrical shape and in which a fluid circulates on a "U"-shaped path between an upstream zone and a downstream zone. The exchanger comprises flow guides having mutually offset castellated sections arranged in the upstream zone and in the downstream zone. The return passage between the upstream zone and the downstream zone, on the other hand, is entirely open and free of any structure. The exchanger is therefore weakened in that zone in which it is liable to deform for the reasons mentioned above. Furthermore, the flexural rigidity of that free zone of the exchanger is very different from that of the upstream and downstream zones in which flow guides are arranged.

These exchangers are therefore not adapted to be bent to complex curved body shapes and thus cannot be integrated therein.

Accordingly, the invention aims to remedy these disadvantages.

The invention aims to propose a heat exchange device, also named a skin exchanger, which is adapted to be able to be mounted with an external face in direct contact with a medium exterior to an atmospheric vehicle, especially an aircraft.

The invention relates especially to a heat exchange device which can be fitted to the surface of an atmospheric vehicle body, especially to the surface of an aircraft fuselage, without affecting the drag of the vehicle—especially of the aircraft.

The invention relates more particularly to a heat exchange device having a warped complex outside surface so that it can be integrated on any type of body and in any zone of a body.

The invention relates also to a heat exchange device of small thickness.

The invention relates to a heat exchange device with high efficiency.

The invention aims also to propose such a device which is resistant to the conditions—especially of pressure and temperature at high altitude and at high speeds—to which an atmospheric vehicle body, such as an aircraft fuselage, is subjected, especially during flight.

The invention relates additionally to a device in which the number of parts is reduced.

The invention relates further to a heat exchange device, the assembly and bending of which are simplified.

The invention relates also to a heat exchange device which is accessible from outside the vehicle and the maintenance of which is thus facilitated.

Accordingly, the invention relates to a heat exchange device comprising:

a first, heat-conducting plate, named the outer plate, a second plate, named the inner plate, an enclosure for circulation of a heat transfer fluid, which enclosure extends between the outer plate and the inner plate, a partitioning which separates the enclosure into a plurality of adjacent zones for circulation of heat transfer fluid, including at least a first zone, named the upstream zone, and a second zone, named the downstream zone, situated downstream of said upstream zone, at least one inlet for injection of heat transfer fluid into the enclosure, arranged upstream of the upstream zone, at least one outlet for removal of heat transfer fluid from the enclosure, arranged downstream of the downstream zone, at least one flow guide, named the upstream guide, arranged in said upstream zone, at least one flow guide, named the downstream guide, arranged in said downstream zone, each flow guide having a plurality of guide walls which are arranged so as to guide said heat transfer fluid generally in said principal direction, said partitioning comprising at least a first partition, named the impermeable partition, which
    is impermeable to the heat transfer fluid,
    extends in a direction, named the principal direction, between an upstream portion of the upstream zone and a downstream portion of the downstream zone so as to separate those portions in an impermeable manner,
    has a length smaller than said upstream zone and said downstream zone, so as to leave a passage, named the return passage, for heat transfer fluid from a downstream portion of the upstream zone to an upstream portion of the downstream zone generally in a direction orthogonal to said principal direction,
    is mechanically joined to the inner plate and to the outer plate so as to be able to hold the outer plate relative to the inner plate, characterised in that said partitioning further comprises at least a second partition, named the grid-type partition, which is arranged in said return passage and extends in the principal direction as a continuation of said impermeable partition, has at least one orifice for circulation of heat transfer fluid between said upstream zone and said downstream zone, is mechanically joined to the inner plate and to the outer plate so as to be able to hold the outer plate relative to the inner plate, and in that it is bent.

Advantageously and according to the invention, the inner plate and the outer plate are impermeable to the heat transfer fluid.

In addition, advantageously and according to the invention, the outer plate is adapted to be in contact with a medium exterior to a vehicle. The outer plate is especially adapted to be able to be exposed to the high atmosphere and to airflows at speeds of the order of Mach. More particularly, the outer plate has a face, named the outside face, which adapted to be in contact with a medium exterior to a vehicle.

In addition, the outer plate has a face, named the inside face, which is opposite the outside face, is arranged facing the inner plate and is adapted to be able to be in direct contact with a heat transfer fluid. The outer plate is adapted to permit heat dissipation from a heat transfer fluid in contact with said inside face to a fluid of a medium exterior (in contact with said outside face) to the vehicle. The outer plate is thus a direct heat exchange surface between a heat transfer fluid situated in the enclosure and said medium exterior to the vehicle. The heat exchange between the heat transfer fluid and the exterior medium is thus optimum.

The outer plate is made of heat-conducting material(s) and has especially an average thermal conductivity greater than 10 $W \cdot m^{-1} \cdot K^{-1}$ at 20° C., especially greater than 20 $W \cdot m^{-1} \cdot K^{-1}$ at 20° C.

The inner plate and the outer plate are arranged at a non-zero distance from one another, named the interparietal distance. This space forms the enclosure for circulation of a heat transfer fluid.

A device according to the invention advantageously has a thickness which is very much smaller than its width and its length. More particularly, the interparietal distance of said device added to the thicknesses of the outer and inner plates is less than 100 times its width and its length.

In a device according to the invention, the heat transfer fluid can be in liquid or gas form.

The enclosure has a closed periphery which is impermeable to the heat transfer fluid. To that end, the partitioning of a device according to the invention further comprises a peripheral wall interposed between the inner plate and the outer plate, delimiting the enclosure and closing it in a manner impermeable to the heat transfer fluid.

Since the components of a device according to the invention, especially the outer and inner plates, must be impermeable to the heat transfer fluid, said peripheral wall and the impermeable partition are consequently chosen to be made of an appropriate material.

The enclosure has as the only openings one or more inlet(s) and one or more outlet(s) for heat transfer fluid. More particularly, the enclosure advantageously has a single fluid inlet and a single outlet.

Moreover, advantageously and according to the invention, each fluid inlet is an opening formed in the inner plate. Likewise, each fluid outlet is advantageously an opening formed in the inner plate. The outer plate is thus smooth and does not have any protruding elements which might impair the aerodynamics of an aircraft.

The enclosure houses a hydraulic circuit for circulation of the heat transfer fluid between at least one inlet and at least one outlet. The terms "upstream" and "downstream" are defined in this hydraulic circuit relative to the normal direction of circulation of heat transfer fluid from a fluid inlet to a fluid outlet.

The fluid inlet opens upstream of the upstream zone, that is to say into an upstream portion of the upstream zone or into a portion of the hydraulic circuit situated upstream of the upstream zone.

Likewise, the fluid outlet opens downstream of the downstream zone, that is to say into a downstream portion of the downstream zone or into a portion of the hydraulic circuit situated downstream of the downstream zone.

The downstream zone is therefore downstream of the upstream zone in the hydraulic circuit.

The upstream zone is at least partly separated from the downstream zone by an impermeable partition. The upstream portion of the upstream zone is especially separated in an impermeable manner from the downstream portion of the downstream zone by one (or more) impermeable partition(s). The heat transfer fluid is thus able to circulate from the upstream zone to the downstream zone only between a downstream portion of the upstream zone and an upstream portion of the downstream zone.

Each impermeable partition extends in a direction named the principal direction. Each impermeable partition is arranged in the enclosure to force the circulation of fluid alternately one way and then the opposite way in the principal direction.

The upstream guide and the downstream guide have guide walls in a direction parallel to said principal direction. The upstream and downstream zones are therefore adapted so that the heat transfer fluid circulates therein generally in the principal direction.

In addition, the fluid inlet is arranged upstream of the upstream zone. The fluid outlet is arranged downstream of the downstream zone. The only passage, named the return passage, for fluid from the upstream zone to the downstream zone is at a distance from the fluid inlet and from the fluid outlet (downstream of the upstream zone and upstream of the downstream zone). The exchange device is thus adapted so that a heat transfer fluid bypasses at least one impermeable partition between the fluid inlet and the fluid outlet.

The hydraulic circuit therefore forms at least one outward and return circulation in the same direction but in opposite ways. The heat transfer fluid therefore follows a hydraulic circuit in the enclosure that is generally "U"-shaped. According to the invention, there is nothing to prevent the fluid from following a plurality of successive "U"-shaped portions in a hydraulic circuit shaped in the enclosure so as to form an "S"-shaped or coiled circulation. In this case, the enclosure is advantageously equipped with a plurality of separating partitions each comprising an impermeable partition and a grid-type partition.

The grid-type partition is advantageously arranged in a return passage of the fluid from the upstream zone to the downstream zone. It allows the fluid to pass while holding the outer plate relative to the inner plate (especially at the interparietal distance). Furthermore, the grid-type partition also allows the exchanger to have flexural rigidity of the same order of magnitude in the region of the return passage and in the region of the impermeable partition.

The grid-type partition is advantageously arranged as a continuation of said impermeable partition. The enclosure is thus separated into at least an upstream zone and a downstream zone by at least one separating partition comprising an impermeable partition which is in one piece or in the form of a plurality of impermeable partition elements placed end to end, and a grid-type partition which is in one piece or in the form of a plurality of grid-type partition elements placed end to end, said grid-type partition being arranged as a continuation of the impermeable partition.

In addition, the impermeable partition and the grid-type partition are advantageously substantially straight in said principal direction.

Moreover, the partitioning is mechanically joined to the inner plate and to the outer plate so as to be able to hold the outer plate at least locally at a fixed distance from the inner plate, especially so as to maintain said interparietal distance between the inside surface of the outer plate and an inside surface of the inner plate.

More particularly, advantageously and according to the invention, the impermeable partition and the grid-type partition are fixed rigidly and continuously—especially are soldered—to the outer plate and to the inner plate.

The partitioning according to the invention thus makes it possible to obtain a heat exchange device with particularly homogeneous flexural rigidity—especially over its whole width with the aim of bending it about a direction parallel to the measuring direction, and especially over its whole length with the aim of bending it about a direction orthogonal to the measuring direction.

The partitioning according to the invention thus makes it possible to obtain a heat exchange device which has particularly high mechanical strength, especially is particularly resistant to the pressure differences between the inside surface of the outer plate (to the heat exchange fluid in the enclosure) and the outside surface of the outer plate (to the pressure of a medium external to a vehicle to which said heat exchange device is fitted).

In a device according to the invention, every transverse section of the grid-type partition advantageously has at least one surface which is mechanically joined to one of the outer or inner plates. Unlike passages created by the total interruption of a partition, a grid-type partition according to the invention is not interrupted in the region of an orifice for circulation of the heat exchange fluid. Furthermore, the uninterrupted partition portion in the region of a circulation orifice is in surface contact with and mechanically joined to at least one of the outer or inner plates.

A partitioning comprising grid-type partitions according to the invention therefore makes it possible to ensure excellent rigidity of the exchange device, homogeneity of the rigidity over the whole of the surface of the exchange device, and holding of the outer plate relative to the inner plate.

A partitioning according to the invention, especially comprising grid-type partitions, also makes it possible to obtain a heat exchange device with homogeneous flexural strength, so that bending thereof is facilitated.

The homogeneity of the flexural rigidity of the exchange device over its whole surface allows it to be bent as desired in one direction (for example about a direction parallel to the principal direction) or in another direction. More particularly, that homogeneity allows the exchanger to be given complex and/or warped curved surface shapes, so that it can be integrated into any zone of a body, including as a replacement for body panels having a complex or warped curved surface. An exchanger according to the invention can thus be integrated into any zone of a vehicle body, especially into any zone of an aircraft fuselage (for example in the nose, on an engine, on a wing).

The grid-type partition can be formed from a sheet with perforations, gratings, mesh, ladders, combs, etc.

More particularly, advantageously and according to the invention, the grid-type partition has at least one face which is entirely in surface contact with and rigidly fixed to one or the other of the outer plate or the inner plate.

Advantageously and according to the invention, said grid-type partition has at least one orifice for circulation of heat transfer fluid in the form of an arch, named the circulation arch.

Each circulation arch is formed on the same face (of said grid-type partition), which is to come into contact with one of the outer or inner plates. The grid-type partition therefore has, on that face, supports, named arch feet, which are in surface contact with said inner plate or said outer plate and are fixed rigidly—especially soldered—thereto. The face (of the grid-type partition) opposite the arch feet is in contact with the second of the inner or outer plates and is fixed rigidly—especially soldered—thereto.

The arch feet of the grid-type partition are preferably in surface contact with and mechanically joined to the outer plate, so that said arches are open along the outer plate, thus maximising the surface of said outer plate that is wetted by the heat transfer fluid. The face of the grid-type partition opposite said arch feet is in surface contact with and mechanically joined to the inner plate.

However, in a device according to the invention, there is nothing to prevent the grid-type wall from having arches along both the outer plate and the inner plate, for example alternately along the inner plate and along the outer plate. It then has wide arch feet which are in surface contact with and mechanically joined to the inner plate, and wide arch feet which are in surface contact with and mechanically joined to the outer plate.

Furthermore, since the inner plate is at a distance, named the interparietal distance, from the outer plate, the span of each circulation arch is less than three times the interparietal distance. More particularly, the span of each circulation arch is advantageously less than twice the interparietal distance. The distance between two successive arch feet is thus small, so that the grid-type partition firmly holds the outer plate relative to the inner plate. The invention thus makes it possible to obtain an exchange device which is particularly resistant and has homogeneous flexural rigidity over its whole surface.

The grid-type partition advantageously comprises a plurality of circulation orifices—especially a plurality of circulation arches. The grid-type partition therefore also comprises a plurality of (at least three) arch feet allowing the outer plate to be held relative to the inner plate at regular distance intervals.

In addition, advantageously and according to the invention, the grid-type partition has a total cross-section for the passage of heat transfer fluid which is adapted so that at least 50% of the heat transfer fluid passing from the upstream zone to the downstream zone passes through said grid-type partition.

More particularly, the grid-type partition has a total cross-section for the passage of heat transfer fluid which is adapted so that at least 75% of the heat transfer fluid passing from the upstream zone to the downstream zone passes through said grid-type partition. Especially, the number and the cross-section of each circulation orifice is adapted to obtain such a result.

In some embodiments of the invention, the only passage for heat transfer fluid between the upstream zone and the downstream zone is through the grid-type partition, so that 100% of the heat transfer fluid passes through the grid-type partition (through its circulation orifices) in order to pass from an upstream zone to a downstream zone.

Moreover, advantageously and according to the invention, each flow guide has surface contacts with the inner plate and with the outer plate, in the region of which said flow guides are mechanically joined to the inner plate and to the outer plate.

Each flow guide has an undulating shape, the height of the undulations being substantially equal to the interparietal distance. Each flow guide thus has a plurality of external zones and internal zones in surface contact with the inside face of the outer plate and of the inner plate, respectively. Each flow guide thus forms a plurality of guide walls delimiting at least portions of conduits for circulation of the heat transfer fluid in said principal direction.

Advantageously and according to the invention, the upstream guide (or the downstream guide) has a plurality of undulations in the width of the upstream zone (or of the downstream zone), so as to form a plurality of channels for circulation of heat transfer fluid in each zone (upstream and downstream) of the circulation enclosure.

Each flow guide advantageously has a profile which undulates regularly according to a periodic form, for example of the sinusoidal or castellated type.

Each flow guide is advantageously joined to the outer plate and to the inner plate by a plurality of surface contacts. More particularly, the (outer and inner) contact zones of each flow guide are advantageously soldered to the inside faces of the outer plate and of the inner plate.

Furthermore, in an advantageous embodiment of the invention, each guide wall of each flow guide has a length which is less than the total length of said flow guide.

In one possible embodiment, each flow guide therefore comprises a plurality of successive guide sections in said principal direction. The guide walls of each guide section are advantageously offset in a direction orthogonal to the principal direction relative to the preceding section and/or relative to the following section in said principal direction. Each section has a length (in the principal direction) which is less than the total length of said flow guide.

Accordingly, in this embodiment, each circulation zone (upstream zone and downstream zone) comprises a plurality of sections each comprising a plurality of parallel guide channels in the principal direction, said sections following one another in said principal direction and being successively offset relative to one another laterally in a direction orthogonal to the principal direction. A first guide channel of a section of a flow guide therefore opens into two adjacent guide channels of a section directly downstream of that first section.

Each flow guide is therefore adapted to create a zigzag circulation of a heat transfer fluid, with a flow generally in the principal direction. In this manner, the heat transfer fluid is at least partially mixed as it passes from one guide section to another. This allows the homogeneity of the heat exchange between the heat transfer fluid and an exterior medium to be improved while preventing part of the heat transfer fluid following a first hydraulic path from cooling to a greater extent than another part of the heat transfer fluid following a second hydraulic path distinct from the first hydraulic path.

Advantageously and according to the invention, the guide sections of the same flow guide have undulations of the same shapes and dimensions—especially of the same period—as the other sections of said flow guide, and has an offset relative to at least one section situated directly upstream and/or directly downstream.

More particularly, each guide section is advantageously offset laterally by a half-period in a direction orthogonal to the guide walls (and therefore orthogonally relative to the principal direction), relative to a section situated directly upstream or situated directly downstream.

The period of the profile of each flow guide advantageously has a length of the same order of magnitude as the interparietal distance, especially a length from 50% to 200% of the intraparietal distance.

Likewise, the length of each guide section is of the same order of magnitude as the interparietal distance, and is especially between 50% and 500% of the interparietal distance.

Other embodiments of the flow guides can be envisaged. Thus, a device according to the invention can comprise flow guides forming a plurality of juxtaposed channels, for example straight or in a zigzag. The channels advantageously have orifices for circulation of fluid between them, for example in the form of louvers, drilled holes or by offset sections as described hereinbefore.

The orifices for circulation of fluid between two channels of a flow guide allow a heat exchange device according to the invention to be proposed in which the flow guides occupy a much larger volume of the enclosure. Especially, they allow the flow guides to be extended as far as a zone of the enclosure which is normally reserved for the change of direction of the heat transfer fluid from an upstream portion to a downstream portion through a return passage. The heat exchange device accordingly has excellent homogeneity of flexural rigidity, whatever the direction of flexion (all the better in combination with a grid-type partition arranged in each return passage, as a continuation of an impermeable partition). This homogeneity also allows such an exchange device to be bent into complex and/or warped shapes.

In addition, such an arrangement allows the number of parts that are to be arranged in the enclosure prior to assembly—especially prior to soldering—to be reduced. More particularly, the number of flow guides is advantageously reduced.

Each flow guide is advantageously formed in a single piece, by stamping a sheet of plastically deformable material, for example by stamping a sheet of an aluminium alloy.

However, the upstream zone and the downstream zone can each comprise one (or more) flow guides, each comprising a plurality of successive sections arranged end to end in the principal direction.

The width of a flow guide is advantageously equal to the width of the upstream zone (in a direction orthogonal to the principal direction). A flow guide according to the invention thus extends, in terms of width, from a side wall of the enclosure to a partition separating an upstream zone and a downstream zone. Each flow guide is thus blocked in translation in a direction orthogonal to the principal direction between a step of assembling and a step of soldering a device according to the invention.

Advantageously, a device according to the invention is also characterised in that:
said upstream zone comprises at least one upstream guide which extends at least in part facing at least one circulation orifice of a grid-type partition separating the upstream zone from the downstream zone,
said downstream zone comprises at least one downstream guide which extends at least in part facing at least one circulation orifice of a grid-type partition separating the upstream zone from the downstream zone.

Advantageously and according to the invention, the length of each flow guide in the principal direction is greater than the length of impermeable partition arranged between the upstream zone and the downstream zone.

The offset of the guide walls between two successive sections of each flow guide allows the heat transfer fluid to zigzag between the guide walls. The fluid thus circulates laterally from one guide channel to an adjacent guide channel, in a transition zone situated in a downstream portion of the upstream zone and in an upstream portion of the downstream zone. The fluid performs a half-turn in this transition zone to pass from the upstream zone to the downstream zone, through one or more circulation orifices of a grid-type partition arranged as a continuation of said impermeable partition.

Moreover, in one possible embodiment according to the invention, the partitioning further comprises partitions separating the upstream zone and the downstream zone from a third zone of the enclosure forming a channel, named the conveying channel, for circulation of heat transfer fluid between the upstream zone and the downstream zone.

Said conveying channel is separated from the upstream zone by a partition, named the upstream conveying partition, which is arranged downstream of the upstream zone and has at least one orifice for circulation of heat transfer fluid between said upstream zone and said conveying channel. Said conveying channel is separated from the downstream channel by a partition, named the downstream conveying partition, which is arranged upstream of the downstream zone and has at least one orifice for circulation of heat transfer fluid between said conveying channel and said downstream zone.

Said conveying channel extends between an edge of the enclosure and said upstream and downstream conveying partitions. Said conveying channel is therefore situated downstream of the upstream zone and upstream of the downstream zone.

The conveying channel advantageously extends over the whole width of the upstream zone and over the whole width of the downstream zone, so as to be able to drain a heat transfer fluid from all the guide channels of the upstream zone and redistribute it in all the guide channels of the downstream zone. The conveying channel thus more particularly allows the pressure loss along longer hydraulic paths to be reduced. The conveying channel therefore allows the flow of heat transfer fluid over the whole surface of the exchanger to be facilitated, especially in guide channels which are far from the central separating partition.

Said conveying channel advantageously does not have flow guides, so that it constitutes a channel for free circulation of the heat transfer fluid. Such a conveying channel facilitates the circulation of heat transfer fluid from the upstream zone to the downstream zone. Such a channel especially facilitates the transfer of heat transfer fluid from the upstream zone to the downstream zone in the case of obstruction of the circulation orifices of the grid-type partition separating the upstream zone from the downstream zone.

Accordingly, during operation, a portion of the heat transfer fluid passes from the upstream zone to the downstream zone through the grid-type partition, and another portion passes through the upstream conveying partition, the conveying channel and then the downstream conveying partition.

Said conveying channel facilitates the circulation of heat transfer fluid in the whole of the upstream zone and the downstream zone, especially in the portions close to the side edges of the upstream and downstream zones.

However, the width of the conveying channel is considerably smaller than its length. The width of the conveying channel is advantageously 10 (ten) times smaller than its length, and more particularly its width is advantageously 50 (fifty) times smaller than its length. This zone of the exchanger is thus not weakened very much by said conveying channel, and the flexural rigidity of the exchange device remains substantially homogeneous. The upstream and downstream conveying partitions and the peripheral wall are in fact mechanically joined to the inner plate and to the outer plate. Since they are close owing to the narrowness of the conveying channel, they serve, in combination, to hold the device structurally—especially the partitions and wall maintain the outer plate at said interparietal distance from the inner plate.

The width of the conveying channel in a device according to the invention is advantageously reduced by virtue of the presence of the grid-type partition, which allows a large amount of heat transfer fluid to pass directly from the upstream zone to the downstream zone, without passing through said conveying channel.

Furthermore, at least one flow guide of the upstream zone extends in the principal direction as far as the upstream conveying partition. Likewise, at least one flow guide of the downstream zone extends in the principal direction starting from the downstream conveying partition.

In an alternative embodiment according to the invention, the device does not have a conveying channel. The upstream zone and the downstream zone thus extend to the end of the enclosure.

In this case, the grid-type partition also advantageously extends to the end of the enclosure. Only said transition zone allows the heat transfer fluid to circulate between the upstream zone and the downstream zone.

In one possible embodiment according to the invention, the partitioning further comprises a partition, named the distribution partition, for separating the upstream zone from a fourth zone of the enclosure forming a channel, named the distribution channel. Said distribution partition has at least one orifice for circulation of heat transfer fluid between said distribution channel and the upstream zone.

Each heat transfer fluid inlet is advantageously adapted to be able to inject the heat transfer fluid into said distribution channel. The inlet is formed in the inside wall and opens into said distribution channel.

The distribution channel advantageously extends over the whole width of the upstream zone. In addition, said distribution channel advantageously does not have a guide wall. It especially does not have guide walls in the principal direction, so as to permit good distribution of a heat transfer fluid in all the guide channels of the upstream zone from a single heat transfer fluid inlet.

Said distribution channel extends between an edge of the enclosure and said distribution partition. Said distribution channel is therefore situated upstream of the upstream zone. Said distribution channel extends from an edge of the enclosure to said impermeable partition.

In one possible embodiment according to the invention, the partitioning further comprises a partition, named the collection partition, for separating the downstream zone from a fifth zone of the enclosure forming a channel, named the collection channel. Said collection partition has at least one orifice for circulation of heat transfer fluid between the downstream zone and said collection channel.

Each heat transfer fluid outlet is advantageously adapted to be able to remove the heat transfer fluid from said collection channel. The outlet is formed in the inside wall and opens into said collection channel.

The collection channel advantageously extends over the whole width of the downstream zone. In addition, said collection channel advantageously does not have a guide wall. It especially does not have guide walls in the principal direction, so as to permit good collection of a heat transfer fluid from all the guide channels of the downstream zone to a single heat transfer fluid outlet.

Said collection channel extends between an edge of the enclosure and said collection partition. Said collection channel is therefore situated downstream of the downstream zone. Said collection channel extends from an edge of the enclosure to said impermeable partition.

The distribution and collection partitions also serve to hold the outer plate mechanically relative to the inner plate—especially at the interparietal distance from one another. Without the presence of the distribution and collection partitions, the distribution and collection channels might be deformed under the effect of the pressure difference between the heat transfer fluid in the enclosure and the exterior medium.

The distribution and collection partitions according to the invention allow distribution and collection channels to be envisaged which are wider and therefore have lower pressure losses, without weakening the structure of an exchange device according to the invention.

However, the width of the distribution channel and of the collection channel is considerably smaller than their length. The widths of the distribution channel and of the collection channel are advantageously 10 (ten) times smaller than their respective lengths, and more particularly their width is advantageously 50 (fifty) times smaller than their length. This zone of the exchanger is thus not weakened very much by said distribution channel and collection channel, and the flexural rigidity of the exchange device remains substantially homogeneous. The distribution and collection partitions and the peripheral wall are in fact mechanically joined to the inner plate and to the outer plate. Since they are close owing to the narrowness of the distribution channel and the collection channel, they ensure, in combination, that the device is held structurally—especially those partitions and wall maintain the outer plate at said intraparietal distance from the inner plate.

The distribution channel and the collection channel are advantageously symmetrical with respect to the impermeable partition. Likewise, the distribution partition and the collection partition are advantageously symmetrical with respect to the impermeable partition. The flexural rigidity of the exchange device is thus homogeneous on either side of the impermeable partition.

Although it is actually less advantageous, there is, however, nothing to prevent envisaging a device having distribution and collection channels which are of very small width and do not have distribution and collection partitions. There is also nothing to prevent envisaging a device which does not have distribution and collection channels and therefore distribution and collection partitions, in which the flow guides would extend to an end of the device where the heat transfer fluid is injected and collected directly in the thickness of the device.

Said (upstream and downstream) conveying, distribution and collection partitions are advantageously formed of partition elements which are identical to the partition elements of the grid-type partition. Said (upstream and downstream) conveying, distribution and collection partitions advantageously have a plurality of circulation orifices in the form of arches.

Said (upstream and downstream) conveying, distribution and collection partitions are fixed rigidly—especially soldered—to the inner plate and to the outer plate so as to be able to hold the outer plate relative to the inner plate.

Each upstream flow guide is blocked in translation in the principal direction by said distribution and upstream conveying partitions, especially between assembly and soldering of a device according to the invention.

Each downstream flow guide is blocked in translation in the principal direction by said downstream conveying and collection partitions, especially between a step of assembling and a step of soldering a device according to the invention.

The distribution of the guide walls for the fluid in each circulation zone is thus not modified during assembly of a device according to the invention. More particularly, the internal geometry and the distribution of the internal elements (especially of the guide walls for the fluid) is not modified during subsequent manufacturing steps, for example during bending of the device.

A heat exchange device according to the invention is advantageously bent.

A device according to the invention accordingly follows and/or reproduces the outside shape of a fuselage, so as to generate minimum drag.

A device according to the invention has a shape bent about an axis parallel to said principal direction.

Alternatively or in combination, a device according to the invention has a shape bent about an axis orthogonal to said principal direction.

A device according to the invention advantageously has a shape bent about a plurality of distinct axes. A device according to the invention is particularly adapted to be shaped in a complex warped shape. This makes it possible to envisage fitting a device according to the invention in all the zones of the body of a vehicle, for example on the nose of an aeroplane, on or in engines, on vertical stabilisers, or also on a body of complex shape such as that of a helicopter.

More particularly, the grid-type, upstream and downstream conveying, distribution and collection partitions, as well as the impermeable partition, are adapted so that the bending resistance (i.e. the flexural rigidity) is homogeneous about an axis orthogonal to the principal direction. Likewise, the grid-type, upstream and downstream conveying, distribution and collection partitions, as well as the impermeable partition, are adapted so that the bending resistance is homogeneous about an axis parallel to the principal direction.

Furthermore, the arrangement of a plurality of flow guides in succession in each (upstream and downstream) circulation zone facilitates the bending of a device according to the invention, especially about an axis orthogonal to the principal direction. Likewise, a flow guide having a plurality of successive laterally offset sections facilitates such bending.

The periodic undulations of the flow guides facilitate the bending of a device according to the invention, especially about an axis parallel to the principal direction.

A device according to the invention is advantageously bent with the inner plate forming a concave outside face of the device and the outer plate forming a convex outside face of the device.

However, in some applications of the invention, there is nothing to prevent bending from being carried out in such a manner that the inner plate forms a concave outside face of the device and the outer plate forms a convex outside face of the device.

Finally, in very specific applications of the invention, the device can be bent in such a manner that each face has at least one inversion of curvature between a concave surface zone and a convex surface zone. The inner plate and the outer plate then each have at least a concave outside surface portion and a convex outside surface portion.

The invention relates also to a method for manufacturing a device according to the invention. It therefore also includes a method for manufacturing a heat exchange device, wherein:
- a first, heat-conducting plate, named the outer plate, is arranged facing a second plate, named the inner plate, so as to form an enclosure for circulation of a heat transfer fluid, which enclosure extends between the outer plate and the inner plate,
- a partitioning is arranged in the enclosure in order to separate the enclosure at least into a first zone, named the upstream zone, for circulation of heat transfer fluid and a second zone, named the downstream zone, for circulation of heat transfer fluid,
- at least one fluid inlet is formed in order to allow the heat transfer fluid to be injected into the enclosure, upstream of the upstream zone,
- at least one fluid outlet is formed in order to allow the heat transfer fluid to be removed from the enclosure, downstream of the downstream zone,
- at least one flow guide, named the upstream guide, is arranged in said upstream zone, each upstream guide having a plurality of walls for guiding the heat transfer fluid which are parallel to one another so as to guide said heat transfer fluid generally in one direction, named the principal direction,
- at least one flow guide, named the downstream guide, is arranged in said downstream zone, said downstream guide having a plurality of walls for guiding the heat transfer fluid which are parallel to one another and are arranged so as to guide said heat transfer fluid generally in said principal direction,
- at least a first partition, named the impermeable partition, of said partitioning, which is chosen to be impermeable to the heat transfer fluid, is arranged in a direction, named the principal direction, at least between an upstream portion of the upstream zone and a downstream portion of the downstream zone so as to separate those portions in an impermeable manner while leaving a passage, named the return passage, for heat transfer fluid from a downstream portion of the upstream zone to an upstream portion of the downstream zone generally in a direction orthogonal to said principal direction, said impermeable partition being mechanically joined to the inner plate and to the outer plate so as to be able to hold the outer plate relative to the inner plate, characterised in that at least a second partition, named the grid-type partition, of said partitioning, which is chosen to have at least one orifice, is arranged in said return passage between the upstream zone and the downstream zone, as a continuation of said impermeable partition, so that each orifice permits circulation of heat transfer fluid between said upstream zone and said downstream zone, said grid-type partition being mechanically joined to the inner plate and to the outer plate so as to be able to hold the outer plate relative to the inner plate, and in that said heat exchange device is subjected to a bending step.

Such a manufacturing method makes it possible to obtain a heat exchange device according to the invention, especially a device which is of small thickness, is particularly resistant and has high heat exchange efficiency. It makes it possible especially to obtain a heat exchange device which can be mounted on the surface of a vehicle body, especially of an aircraft fuselage.

For that reason, advantageously, during the method according to the invention, said heat exchange device is bent.

In addition, advantageously and according to the invention:
- a soldering sheet is interposed between the inner plate, on the one hand, and the partitioning and the flow guides, on the other hand,
- a soldering sheet is interposed between the outer plate, on the one hand, and the partitioning and the flow guides, on the other hand,
- once assembled, said heat exchange device is subjected simultaneously to soldering heating and to bending.

More particularly, the device is subjected to bending on an anvil by creep under the effect of soldering heating and gravity under the effect of its own weight. The shape of the anvil is chosen according to the shape which is to be given to the exchanger according to the invention, thus making it possible to obtain a heat exchange device according to the invention of any shape, including warped and/or complex shapes.

Each (upstream and downstream) flow guide, each impermeable partition, each grid-type partition, each (upstream and downstream) conveying partition, each distribution partition, each collection partition and the peripheral wall are joined to the inner plate and to the outer plate by soldering.

The invention relates also to a heat exchange device and to a method for manufacturing such a device which are characterised in combination by all or some of the features mentioned hereinabove or hereinbelow.

Figure 5:
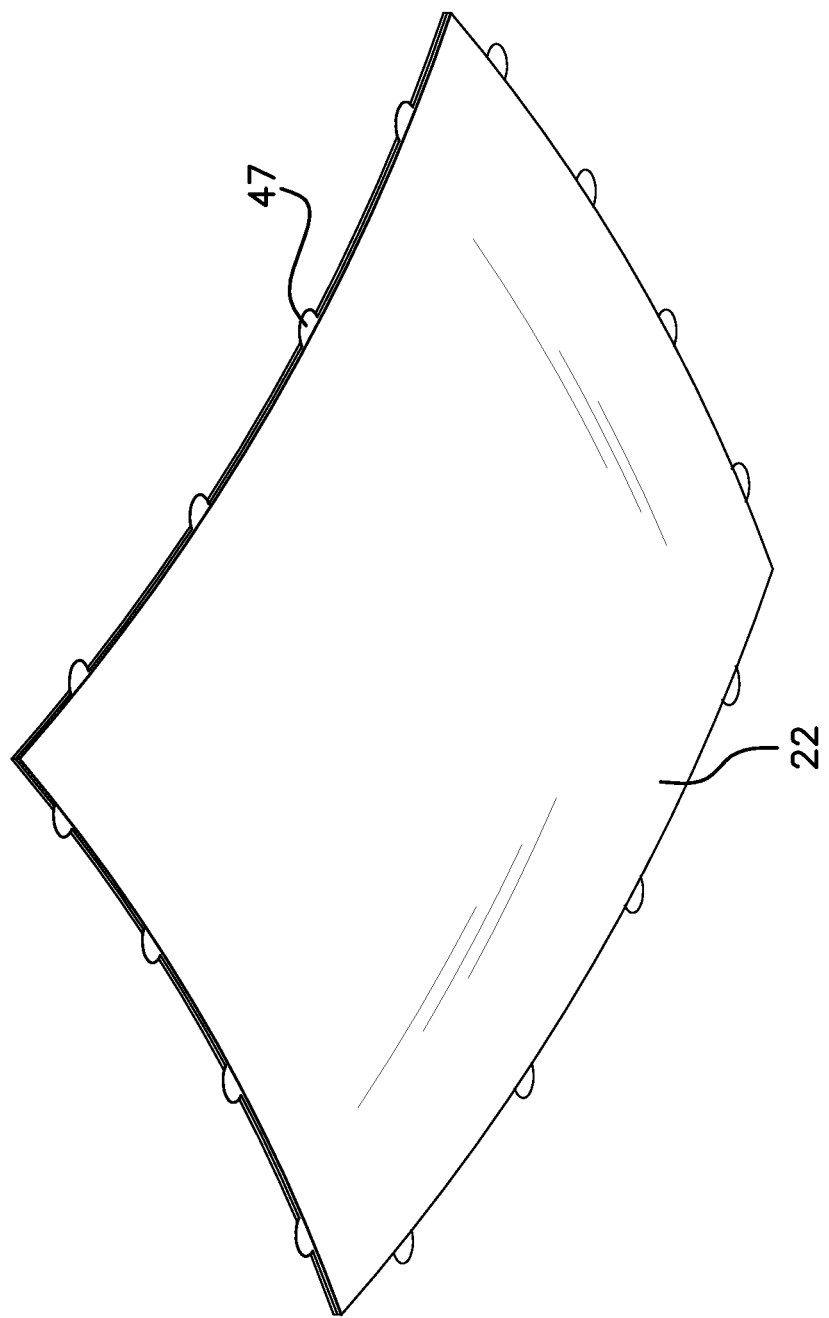

Other objects, features and advantages of the invention will become apparent upon reading the following description, which is given without implying any limitation and makes reference to the accompanying figures, in which:

FIG. 1 is a schematic representation of a heat exchange device, zones of which are shown in section through a mid-plane with portions of possible fluid circulation paths, in accordance with an embodiment according to the invention, FIG. 2 is a schematic representation of a heat exchange device according to FIG. 1 through a longitudinal section II-II, with a central portion cut away, before a soldering and bending step, FIG. 3 is a schematic representation of a heat exchange device according to FIGS. 1 and 2 through a transverse section with intermediate portions cut away, before a soldering and bending step, FIG. 4 is a schematic representation of a heat exchange device according to FIGS. 1, 2 and 3 in an exploded view, without the flow guides in order to facilitate reading of the figure, FIG. 5 is a schematic representation of a heat exchange device according to FIGS. 1, 2, 3 and 4, in a perspective view, of the outer plate, once assembled, soldered and bent.

The heat exchange device shown is symmetrical relative to a central axis of symmetry. The flexural rigidity is thus homogeneous at least in a direction perpendicular to a principal direction 48.

The exchange device comprises an inner plate 21 and an outer plate 22. The plates are made, for example, of aluminium alloy, of steel, of titanium alloy or also of nickel alloy—especially of nickel-based superalloy such as Inconel®. In the example shown, they are preferably made of aluminium alloy.

Between the two plates there are interposed a plurality of internal parts, especially spacers forming a partitioning of an enclosure for circulation of fluid between the inner plate 21 and the outer plate 22.

The device comprises especially four peripheral walls 44 which are placed end to end at 90° relative to one another so as to delimit an enclosure between the inner plate and the outer plate. The peripheral wall 44 has a thickness corresponding to the interparietal distance 32 which is to be obtained between the inside surface of the inner plate and the inside surface of the outer plate. The peripheral wall is chosen to be of a material which is impermeable to the heat transfer fluid that is to be received by the exchange device.

Each section of peripheral wall 44 further has a plurality of assembly bosses 47 having a thickness greater than the interparietal distance 32. Said assembly bosses 47 are arranged outside the enclosure. The outer plate 22 and a soldering sheet 36 have bores which are adapted so that said assembly bosses 47 of the peripheral wall can be introduced therein so as to block it in translation in the plane of said outer plate between the moment at which the device is assembled and the moment at which all the internal parts are joined to the inner and/or outer plates.

The inner plate has two openings which open into the enclosure and are distributed symmetrically relative to said axis of symmetry of the device. One of the openings is an inlet 25 for a heat transfer fluid, the other is an outlet 26 for said heat transfer fluid.

The fluid inlet 25 is adapted so that a fluid supply orifice 45 can be connected thereto. The fluid outlet 26 is adapted so that a fluid collection orifice 46 can be connected thereto.

The fluid circulation enclosure is separated into two fluid circulation zones by a partition 29 which is impermeable to the heat transfer fluid and is arranged according to the axis of symmetry of said device, and a grid-type partition 30 which is arranged according to the axis of symmetry as a continuation of the impermeable partition 29, said partitions being straight. Said principal direction 48 is parallel to said axis of symmetry. Said impermeable and grid-type partitions extend in said principal direction.

The impermeable partition 29 extends from a first edge of the enclosure situated on the inlet 25 and outlet 26 side into the enclosure. It extends especially at least starting from the peripheral wall. As is shown in FIG. 1, it in fact extends slightly beyond the peripheral wall 44 to the exterior of the enclosure.

The grid-type partition 30 extends from the end of the impermeable partition that is situated in the enclosure to the vicinity—but at a non-zero distance which is voluntarily left free—of a second edge of the enclosure opposite the first edge from which the impermeable partition extends. The grid-type partition stops before the second edge so as to leave a channel, named the conveying channel, between said second edge formed by the peripheral wall 44 and the end of the grid-type partition.

By continuing the impermeable partition, the grid-type partition ensures homogeneity of flexural rigidity in the principal direction.

The grid-type partition has a plurality of orifices in the form of through-arches 31 between the upstream zone 23 and the downstream zone 24. In the particular embodiment shown by way of example, each arch 31 has a passage cross-section of approximately 14 mm$^2$. The grid-type partition has a total cross-section for the passage of heat exchange fluid of approximately 500 mm$^2$, adapted so that approximately 80% of the heat exchange fluid passes through the grid-type partition.

On either side of each arch 31, the grid-type partition 30 has arch feet in contact with and joined to—by soldering—the outer wall. The span of each arch is less than twice the interparietal distance 32. In the example shown, the interparietal distance 32 is approximately 3.6 mm while the span of each arch is approximately 3 mm. The grid-type partition therefore has a thickness of at least 1 mm over its whole length, imparting high mechanical strength to the device.

To that end, the face of the grid-type partition opposite the face on which the arches are open is in surface contact with and joined to—by soldering—the inner plate 21.

The grid-type partition has, on that face joined to the inner plate, assembly bosses 49 which are introduced into bores 50 in the inner plate 21 and the soldering sheet 35, so as to block it in translation in the plane of said outer plate between the moment at which the device is assembled and the moment at which the internal parts are joined to the inner and/or outer plates.

The grid-type partition can be formed in one piece or by a plurality of grid-type partition elements placed end to end. In the example shown, it is formed by means of two partition elements placed end to end. This allows economies of production scale to be achieved by using said elements as an element of other partitions of said device: especially the conveying partitions 38, 39, the distribution partition 40 and the collection partition 41 described hereinbelow.

The partitioning in fact comprises a partition, named the upstream conveying partition 38, which extends from the grid-type wall to a peripheral wall 44. The upstream conveying partition 38 separates the upstream zone 23 from a channel, named the conveying channel 34, which extends over the whole width of the device, downstream hydraulically of the upstream zone and upstream hydraulically of the upstream zone.

Said conveying channel 34 does not have a guide wall or a partition so as to allow a heat transfer fluid to circulate freely over its whole length, especially in order to pass from the upstream zone 23 to the downstream zone 24.

In the particular embodiment shown by way of example, the conveying channel has a width of approximately 16 mm, that is to say a cross-section for the passage of fluid of approximately 57.6 mm$^2$. The cross-section for the passage of heat transfer fluid of the conveying channel is therefore at least 8 times smaller than the total cross-section for the passage of heat transfer fluid of the grid-type partition. Only 20% at most of the heat transfer fluid thus passes from the upstream zone 23 to the downstream zone 24 through the conveying channel 34.

In order to permit the circulation of the heat transfer fluid between the upstream zone and the conveying channel, the upstream conveying partition 38 is advantageously formed of the same partition elements as the grid-type partition, so that it has through-arches 31 between the upstream zone and the conveying channel 34.

Likewise, the partitioning comprises a partition, named the downstream conveying partition 39, which extends from the grid-type wall to a peripheral wall 44, symmetrically to said upstream conveying partition 38 relative to the grid-type partition. The downstream conveying partition 39 separates said conveying channel 34 from the downstream zone 24.

In order to permit the circulation of the heat transfer fluid between the conveying channel and the downstream zone, the downstream conveying partition 39 is advantageously formed of the same partition elements as the grid-type partition, so that it has through-arches between the conveying channel 34 and the downstream zone 24.

The upstream conveying partition 38 and the downstream conveying partition 39 are placed end to end at a right angle with an end of the grid-type partition 30, so that the grid-type partition does not form a passage restriction in the conveying channel 34.

The heat transfer fluid thus circulates from the upstream zone 23 to the downstream zone 24 either through the grid-type partition 30 or through the upstream conveying partition 38 and then into the conveying channel 34 and then through the downstream conveying partition 39.

No hydraulic path is thus particularly favoured over others, so as to ensure good distribution of the heat transfer fluid in the heat exchange device. The passage of a fluid circulating, in the upstream zone and/or in the downstream zone, close to the peripheral wall 44 is in fact facilitated by the conveying channel without a wall. In a device according to the invention, the circulation of heat transfer fluid is thus equally as good along a short hydraulic path between a fluid inlet 25 and a fluid outlet 26 as along longer hydraulic paths.

The upstream conveying partition 38 and the downstream conveying partition 39 each have a total cross-section for passage of heat transfer fluid of approximately 750 mm$^2$.

The partitioning also comprises a distribution partition 40 which extends from the impermeable partition 29 to a peripheral wall 44. The distribution partition 40 separates the upstream zone 23 from a channel, named the distribution channel 42.

The fluid inlet 25 opens into said distribution channel 42. Said distribution channel 42 does not have a guide wall or a partition, so as to allow a heat transfer fluid to circulate freely over its whole length.

The distribution partition 40 is advantageously formed of the same partition elements as the grid-type partition, so that it has through-arches 31 between the distribution channel and the upstream zone. The distribution channel 42 thus allows the heat transfer fluid to be distributed throughout the upstream zone 23 after it has been introduced into the enclosure through the inlet 25.

Likewise, the partitioning further comprises a collection partition 41 which extends from the impermeable partition 29 to a peripheral wall 44, symmetrically to the distribution partition relative to the impermeable partition 29. The collection partition 41 separates the downstream zone 24 from a channel, named the collection channel 43.

The distribution and collection partitions each have a total cross-section for passage of heat transfer fluid of approximately 750 mm$^2$.

The fluid outlet 26 opens into said collection channel 43. Said collection channel 43 does not have a guide wall or a partition, so as to allow a heat transfer fluid to circulate freely over its whole length.

The collection partition 41 is advantageously formed of the same partition elements as the grid-type partition, so that it has through-arches between the downstream zone and the collection channel. The collection channel 43 thus allows the heat transfer fluid coming from the whole of the downstream zone 24 to be collected and subsequently removed from the enclosure via the outlet 26.

Four flow guides 27 are arranged in the upstream zone 23 and four flow guides 27 are arranged in the downstream zone 24. They are arranged one after the other, in the same direction Each flow guide 27 has guide walls 28, 53 which are parallel to the impermeable wall 29 and the grid-type wall 30 and form a plurality of guide channels 54 so as to favour the circulation of the heat transfer fluid generally in that direction, both in the upstream zone and in the downstream zone. The flow guides, by means of their guide walls, allow the fluid to be distributed throughout the (upstream and downstream) circulation zone in order to optimise the heat exchange by avoiding the formation of a preferential hydraulic path for the heat transfer fluid, and thus minimise the edge effects of the flow of heat transfer fluid in the enclosure.

Each flow guide 27 is formed of a plurality of successive sections each having a castellated profile, so as to form guide walls 28, 53 and surface contact zones with the inner plate 21 and with the outer plate 22. Two successive sections are offset laterally, so that the guide walls 53 of a section situated directly downstream of another section are offset laterally (in a direction orthogonal to the impermeable and grid-type walls) relative to the guide walls 28 thereof.

Such flow guides 27 are shown in section in FIG. 1, in an enlarged and partially cutaway manner in order to facilitate reading of the figure.

The pitch of the castellated profile of each section of each flow guide 27 is advantageously approximately 4 mm, that is to say about the same value as the interparietal distance 32.

The length of each section of each flow guide 27 is approximately 6 mm, so that the heat transfer fluid is mixed slightly every 6 mm of its path in an exchange device according to the invention.

Furthermore, the device comprises means for fixing the heat exchange device to a support panel of a vehicle body (especially an aircraft fuselage), which means are adapted to permit distribution of the mechanical stresses to which the heat exchange device on the support panel is subjected.

To that end, the device comprises especially fixing eyelets 52 which pass through the enclosure of the device in the direction of its thickness, in a leak-tight manner, and which are adapted to be able to cooperate with members (for example screws or rivets) for fixing to said support panel. The device shown comprises four fixing eyelets 52 in the upstream zone 23 and four fixing eyelets 52 in the downstream zone 24.

Each fixing eyelet 52 is mounted in the middle of a flow guide 27, so as to immobilise it in translation between assembly and soldering of the device.

Each fixing eyelet 52 has opposing shoulders so as to maintain the outer plate at the interparietal distance 32 from the inner plate. Said shoulders are advantageously soldered to the inside surfaces of the inner plate and of the outer plate, so as to improve the mechanical strength of the device. The eyelets can be mounted in housings 51 in the inner plate 21.

In accordance with the invention, a device according to the invention as shown in FIG. 4 is assembled in a first step and then, in a second step, it is simultaneously bent and heated to a temperature suitable for soldering. The temperature is chosen to be greater than the melting temperature of the soldering sheets 35, 36 and lower than the melting temperatures of the other elements of the device.

Such a method makes it possible to obtain a heat exchange device according to the invention which is bent so that it can be integrated on a vehicle body without affecting its drag and without plastic deformation of the parts of which it is composed, especially without plastic deformation of the parts soldered to the inside surfaces of the inner plate and of the outer plate.

Such a device is shown in FIG. 5. It is bent in at least two directions: about an axis parallel to the principal direction 48 and about an axis orthogonal to the principal direction 48. It is bent so that the outer plate 22 has an outside surface (which is to be in contact with a medium exterior to a vehicle) of convex shape, and the inner plate 21 has a concave outside surface (not visible in the view shown in FIG. 5).

The invention can be the subject of many other variant embodiments which are not shown.

There is nothing to prevent each (upstream and downstream) circulation zone from housing a single flow guide, in one piece, so as to facilitate assembly of a device according to the invention.

The circulation orifices do not necessarily have the shape of arches and can be, for example, drilled holes, a first face of the grid-type partition then being wholly in contact with a first of the inner or outer plates, and a second face, opposite the first face, of the grid-type partition being wholly in contact with the second of the inner or outer plates.

Tightness at the periphery of the enclosure can also be achieved by welding or soldering of the inner and outer plates to one another, by assembly with or without a peripheral seal interposed between the two plates, etc.

The invention claimed is:

1. A bent heat exchange device comprising:
    a first, heat-conducting plate, named the outer plate,
    a second plate, named the inner plate,
    an enclosure for circulation of a heat transfer fluid, which enclosure extends between the outer plate and the inner plate,
    a partitioning which separates the enclosure into a plurality of adjacent zones for circulation of heat transfer fluid, including at least a first zone, named the upstream zone, and a second zone, named the downstream zone, situated downstream of said upstream zone,
    at least one inlet for injection of heat transfer fluid into the enclosure, arranged upstream of the upstream zone,
    at least one outlet for removal of heat transfer fluid from the enclosure, arranged downstream of the downstream zone,
    at least one flow guide, named the upstream guide, arranged in said upstream zone,
    at least one flow guide, named the downstream guide, arranged in said downstream zone, wherein:
        each flow guide has a plurality of guide walls which are arranged so as to guide said heat transfer fluid generally in said principal direction, and
        said partitioning comprises at least a first partition, named the impermeable partition, wherein said impermeable partition:
        is impermeable to the heat transfer fluid,
        extends in a direction, named the principal direction, between an upstream portion of the upstream zone and a downstream portion of the downstream zone so as to separate those portions in an impermeable manner,
        has a length smaller than said upstream zone and said downstream zone, so as to leave a passage, named the return passage, for heat transfer fluid from a downstream portion of the upstream zone to an upstream portion of the downstream zone generally in a direction orthogonal to said principal direction,
        is mechanically joined to the inner plate and to the outer plate so as to be able to hold the outer plate relative to the inner plate,
    wherein said partitioning further comprises:
        at least a second partition, named the grid-type partition, and
    partitions separating the upstream zone and the downstream zone from a third zone of the enclosure forming a channel, named the conveying channel, for circulation of heat transfer fluid between the upstream zone and the downstream zone,
    wherein said grid-type partition:
        is arranged in said return passage and extends in said principal direction as a continuation of said impermeable partition,
        has at least one orifice for circulation of heat transfer fluid between said upstream zone and said downstream zone,
        is mechanically joined to the inner plate and to the outer plate so as to be able to hold the outer plate relative to the inner plate, and
        is bent.

2. Device according to claim 1, wherein every transverse section of the grid-type partition has at least one surface which is mechanically joined to one of the outer or inner plates.

3. Device according to claim 1, wherein the grid-type partition has at least one orifice for circulation of heat transfer fluid in the form of an arch, named the circulation arch.

4. Device according to claim 3, wherein since the inner plate is at a distance, named the interparietal distance, from the outer plate, the span of each circulation arch is less than three times the interparietal distance.

5. Device according to claim 1, wherein each flow guide has surface contacts with the inner plate and with the outer plate, in the region of which said flow guides are mechanically joined to the inner plate and to the outer plate.

6. Device according to claim 1, wherein each guide wall of each flow guide has a length which is less than the total length of said flow guide.

7. Device according to claim 1, wherein:
    said upstream zone comprises at least one upstream guide which extends at least in part facing at least one circulation orifice of a grid-type partition separating the upstream zone from the downstream zone, and
    said downstream zone comprises at least one downstream guide which extends at least in part facing at least one circulation orifice of a grid-type partition separating the upstream zone from the downstream zone.

8. Device according to claim 1, wherein the width of said conveying channel is advantageously 10 times less than its length.

9. Device according to claim 1, wherein the device is bent about a plurality of distinct axes.

10. Method for manufacturing a heat exchange device, wherein:
    a first, heat-conducting plate, named the outer plate, is arranged facing a second plate, named the inner plate, so as to form an enclosure for circulation of a heat transfer fluid, which enclosure extends between the outer plate and the inner plate,
    a partitioning is arranged in the enclosure in order to separate the enclosure at least into a first zone, named the upstream zone, for circulation of heat transfer fluid and a second zone, named the downstream zone, for circulation of heat transfer fluid,
    at least one fluid inlet is formed in order to allow the heat transfer fluid to be injected into the enclosure, upstream of the upstream zone,
    at least one fluid outlet is formed in order to allow the heat transfer fluid to be removed from the enclosure, downstream of the downstream zone, at least one flow guide named the upstream guide, is arranged in said upstream zone, each upstream guide having a plurality of walls for guiding the heat transfer fluid which are parallel to one another so as to guide said heat transfer fluid generally in one direction, named the principal direction, at least one flow guide, named the downstream guide, is arranged in said downstream zone, said downstream guide having a plurality of walls for guiding the heat transfer fluid which are parallel to one another and are arranged so as to guide said heat transfer fluid generally in said principal direction, at least a first partition, named the impermeable partition, of said partitioning, which is chosen to be impermeable to the heat transfer fluid, is arranged in a direction, named the principal direction, at least between an upstream portion of the upstream zone and a downstream portion of the downstream zone so as to separate those portions in an impermeable manner while leaving a passage, named the return passage, for heat transfer fluid from a downstream portion of the upstream zone to an upstream portion of the downstream zone generally in a direction orthogonal to said principal direction, said impermeable partition being mechanically joined to the inner plate and to the outer plate so as to be able to hold the outer plate relative to the inner plate, wherein said heat exchange device is subjected to a bending step, wherein at least a second partition, named the grid-type partition, of said partitioning, which is chosen to have at least one orifice, is arranged in said return passage between the upstream zone and the downstream zone, as a continuation of said impermeable partition, so that each orifice permits circulation of heat transfer fluid between said upstream zone and said downstream zone, said grid-type partition being mechanically joined to the inner plate and to the outer plate so as to be able to hold the outer plate relative to the inner plate, and wherein said partitioning further comprises partitions separating the upstream zone and the downstream zone from a third zone of the enclosure forming a channel, named the conveying channel, for circulation of heat transfer fluid between the upstream zone and the downstream zone.

11. Method according to claim 10, wherein:

a soldering sheet is interposed between the inner plate, on the one hand, and the partitioning and the flow guides, on the other hand, a soldering sheet is interposed between the outer plate, on the one hand, and the partitioning and the flow guides, on the other hand, and once assembled, said heat exchange device is subjected simultaneously to soldering heating and to bending.

12. Device according to claim 2, wherein the grid-type partition has at least one orifice for circulation of heat transfer fluid in the form of an arch, named the circulation arch.

13. Device according to claim 2, wherein each flow guide has surface contacts with the inner plate and with the outer plate, in the region of which said flow guides are mechanically joined to the inner plate and to the outer plate.

14. Device according to claim 2, wherein each guide wall of each flow guide has a length which is less than the total length of said flow guide.

15. Device according to claim 2, wherein:

said upstream zone comprises at least one upstream guide which extends at least in part facing at least one circulation orifice of a grid-type partition separating the upstream zone from the downstream zone, and said downstream zone comprises at least one downstream guide which extends at least in part facing at least one circulation orifice of a grid-type partition separating the upstream zone from the downstream zone.

16. Device according to claim 2, wherein the device is bent about a plurality of distinct axes.

* * * * *